United States Patent
McLean et al.

(10) Patent No.: US 11,177,964 B2
(45) Date of Patent: Nov. 16, 2021

(54) BLOCKCHAIN BASED AUTHENTICATION

(71) Applicant: INTERNATIONAL BUSINESS MACHINES CORPORATION, Armonk, NY (US)

(72) Inventors: Leigh S. McLean, Nerang (AU); Narayana A. Madineni, Southport (AU)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/257,126

(22) Filed: Jan. 25, 2019

(65) Prior Publication Data

US 2020/0244464 A1 Jul. 30, 2020

(51) Int. Cl.
*H04L 9/32* (2006.01)
*H04L 9/08* (2006.01)
*H04L 29/06* (2006.01)
*H04L 9/06* (2006.01)

(52) U.S. Cl.
CPC .......... *H04L 9/3247* (2013.01); *H04L 9/0618* (2013.01); *H04L 9/0838* (2013.01); *H04L 9/3236* (2013.01); *H04L 2209/38* (2013.01)

(58) Field of Classification Search
CPC ... H04L 9/3247; H04L 9/3236; H04L 9/0838; H04L 9/0618; H04L 9/3213; H04L 9/3239; H04L 2209/38; H04L 63/0807; H04L 63/126
See application file for complete search history.

(56) References Cited

U.S. PATENT DOCUMENTS

| | | | |
|---|---|---|---|
| 10,484,343 B1 * | 11/2019 | Silberman | H04L 63/0428 |
| 10,785,021 B1 * | 9/2020 | Prabhat | H04L 9/3213 |
| 2008/0301804 A1 * | 12/2008 | Zhang | H04L 63/0807 |
| | | | 726/20 |
| 2017/0330179 A1 | 11/2017 | Song | |
| 2017/0366348 A1 | 12/2017 | Weimer | |

(Continued)

FOREIGN PATENT DOCUMENTS

| CN | 106779716 A | 5/2017 |
|---|---|---|
| WO | 2018146113 A1 | 8/2018 |

OTHER PUBLICATIONS

Kuebler, "Application of Blockchain for Authentication, Verification of Identity and Cloud Computing", In Partial Fulfillment of the Requirements for the Degree of Master of Science in Financial Crime and Compliance Management, Utica College, May 2018, 11 pages.

(Continued)

*Primary Examiner* — Vu V Tran
(74) *Attorney, Agent, or Firm* — Dmitry Paskalov

(57) ABSTRACT

A method, computer system, and a computer program product for blockchain based authentication is provided. The present invention may include receiving a request packet. The present invention may also include adding the request packet to a blockchain. The present invention may then include creating a hash based on the added request packet and the blockchain. The present invention may further include transmitting the hash to a user. The present invention may also include receiving a verifier packet, wherein the verifier packet includes an authentication token generated by the user that incorporates the transmitted hash.

14 Claims, 7 Drawing Sheets

(56) References Cited

U.S. PATENT DOCUMENTS

| | | | |
|---|---|---|---|
| 2018/0276666 A1* | 9/2018 | Haldenby | G06Q 20/20 |
| 2019/0028276 A1* | 1/2019 | Pierce | G06Q 20/02 |
| 2020/0007316 A1* | 1/2020 | Krishnamacharya | H04L 63/0815 |
| 2020/0014528 A1* | 1/2020 | Nandakumar | H04L 9/3228 |
| 2020/0092101 A1* | 3/2020 | Ajitomi | H04L 9/3213 |
| 2020/0186523 A1* | 6/2020 | Kursun | H04L 63/0876 |
| 2021/0224934 A1* | 7/2021 | Williams | G06N 20/00 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

BLOCKCHAIN BASED AUTHENTICATION

BACKGROUND

The present invention relates generally to the field of computing, and more particularly to blockchain based authentication. Authentication systems provide secure networks for specified users to access protected resources such as applications, networks, databases and services. Authentication systems have multiple users that request authentication to an authentication server or verifier server. Current systems may maintain an audit of the authentication history at a verifier, however, the authentication history may not be tamper-proof and may not provide non-repudiation services.

SUMMARY

Embodiments of the present invention disclose a method, computer system, and a computer program product for blockchain based authentication. The present invention may include receiving a request packet. The present invention may also include adding the request packet to a blockchain. The present invention may then include creating a hash based on the added request packet and the blockchain. The present invention may further include transmitting the hash to a user. The present invention may also include receiving a verifier packet, wherein the verifier packet includes an authentication token generated by the user that incorporates the transmitted hash.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
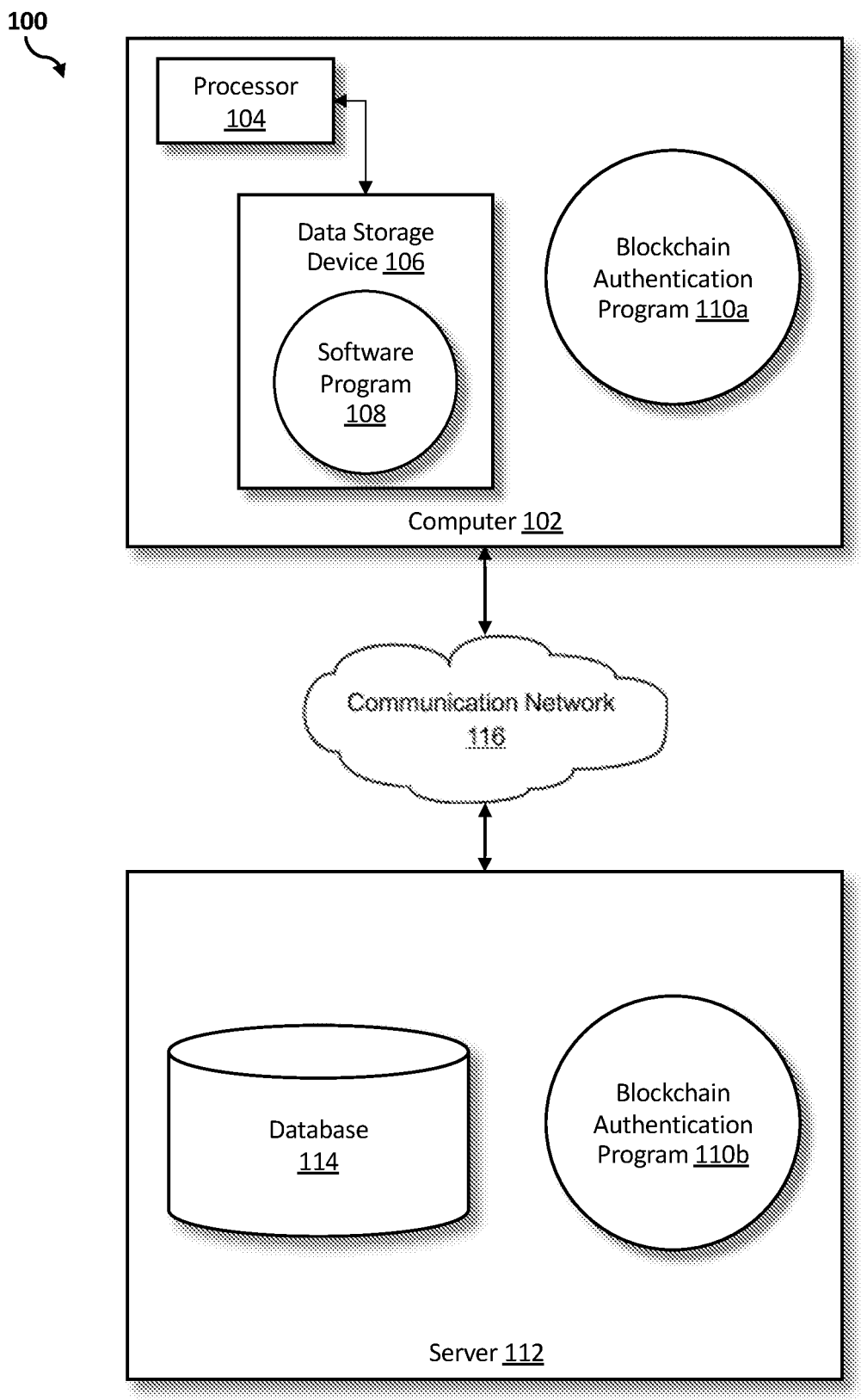
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for blockchain based authentication. As such, the present embodiment has the capacity to improve the technical field of blockchain based authentication by creating a tamper-proof audit log of the authentication history that provides non-repudiation services for all parties or users. More specifically, the blockchain based authentication system will use the history of the process of authentication so that the authentication is tightly coupled with the authentication history log. Utilizing blockchain technology to store the authentication history in a blockchain, to hash a portion or the entire blockchain, to create authentication tokens and to validate hash comparisons on a blockchain server may ensure a tightly coupled authentication history with the user authentication process. Tokens may not be reused to authenticate the same user multiple times since the blockchain changes with each entry, for example, different hash values for each entry.

As previously described, authentication systems may provide secure networks for specified users to access protected resources such as applications, networks, databases and services. Authentication systems may have multiple users that request authentication to a verifier server (i.e., verifier or authentication server). Although current authentication systems may have the ability to create and maintain an audit of the authentication history at the verifier, the history may not be tamper-proof (i.e., may be altered, amended or changed without the proper authority to make such amendment) and may not provide non-repudiation services.

Blockchain technology may include a shared log of events that are kept in blocks of data that may be passed to the next transaction in a linear order. A block may contain the data of one or more records or transactions. A block may hold or store the data before the block has been completed, prior to consensus and prior to being transferred to the next block in a blockchain, for example, using a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since, for example, a hash value on each block may be created and any change or amendment in data will show a different hash value. Each block may contain the hash of the previous block and the current transactions before the next hash may be created. Once consensus is reached, the data may be verified. Each block may have a hash value of the previous block in the chain and there may be no way to modify the data in the previous block. If the data is modified, the modified data may be detected by a re-calculated hash value. A different hash value may show that the network system has been compromised.

Non-repudiation services may provide validity and integrity to the origin of the data by using, for example, digital certificates or digital signatures. A digital signature may preclude data from being amended during transmission, for example, by adding an encryption (i.e., a hash) of the data content using encryption keys. Hashing the data may provide some safeguards, however, the hashed data may be tampered with during transmission of the data. Therefore, it may be advantageous to, among other things, provide a system and method for an authentication system to record and store an authentication history in a blockchain and to use the hash of the blockchain at the time of the hash to generate an authentication token that tightly couples the blockchain to the authentication process.

According to at least one embodiment, the authentication history that is stored in a blockchain (i.e., a ledger and a state database) may be used to create a hash of the blockchain data at a time that an authentication token is generated. The authentication token may couple the blockchain to the authentication process. Blockchain technology may be leveraged to both log and to authenticate a user request using an audit trail and to provide non-repudiation services for each user in the blockchain network.

A user may request access to a protected resource (i.e., an asset). A protected resource may include data that is not available to a user unless the user obtains verification and authentication such that the user may access the protected resource. Protected resources may include, for example, applications, networks, databases, services, confidential documents, user medical data (e.g., protected health information or medical lab test results), user financial data or employer protected documents. The user may have or be provided with an encryption key for access, such as an asymmetric key pair (i.e., a public certificate and a private key). The key pair may be authenticated by a blockchain server before the user may be allowed access, such as read or write access, or both read and write access, to the blockchain server. The user may request access, for example, from a personal computing device that transmits the access request via a communication network to a verifier server.

A verifier may process one or more user authentication requests. The verifier may validate user access (i.e., user verification) to the protected resource and may have stored encryption keys (e.g., asymmetric public and private key pairs) that may be authenticated with a blockchain server to allow the user read or write access to the asset on the blockchain server.

The blockchain server may store the blockchain data and encryption keys (e.g., asymmetric key pairs) that protect the asset. The blockchain server may control access (i.e., authentication) to the blockchain (e.g., the protected resource) from the verifier and the users. For example, a verifier checks user identification data (e.g., name, email address, security questions) against a database and obtains an authentication token from the user and the blockchain server receives the authentication token and allows the user access to the asset if the verification process is successful. The blockchain server verification process may include, for example, comparing hash values once receiving a verifier packet.

The blockchain may receive and store user and verifier registration information and interactions, such as user identification information, transactions, interactions, payment transactions, verifier requests, verifier packets, registration requests, registration packets, blockchain hashes and authentication tokens. Blockchain may also receive and store transaction details for user authentication and an audit log. A blockchain may be created, for example, for each verifier and each verifier may have multiple users. A hash of the whole blockchain may be stored and used for authentication. A hash of the portion of the blockchain from the genesis block to the user request block may be used during verification.

Various data packets may be utilized for registrations, requests, hashes, authentication and verifications. A verifier registration packet may be used to create a first (i.e., genesis) block for the blockchain on the blockchain server. The verifier registration packet may be transmitted from the verifier to the blockchain server for an initial registration. The verifier registration packet may contain verifier identification information (e.g., a uniform resource locator (URL), a name or an email address), registered user identification information (e.g., the identification information for all registered users), a verifier public key, a nonce (i.e., a counter, a timestamp or a non-repeated random number), and other information used to restrict authentication. Other information or data used to restrict authentication may include, for example, a username, a password, a security question or biometric data (e.g., a fingerprint scan or a retina scan). The verifier registration packet may also be digitally signed by the verifier.

A user registration packet may be transmitted from the user to the blockchain server for an initial registration and may be utilized to register a user with a verifier blockchain. The user registration packet may contain verifier information, user identification information (e.g., a URL, name, email address, residence address, telephone number or biometric data), a user public key, a nonce and other data used to restrict authentication. The registration user packet may also be digitally signed by the user.

A request packet may be transmitted or requested from the user to the blockchain server and may be used to request a blockchain hash for authentication from the blockchain server. The request packet may contain user identification information, a nonce or other data used to restrict authentication. The request packet may be digitally signed by the user.

A verifier packet may be transmitted from the verifier to the blockchain server and may be used by the verifier to request confirmation of the user authentication token from the blockchain server. The verification packet may include the authentication token that contains a hash received from the user, a blockchain server signature, a nonce or other data used to restrict information. The verification packet may be digitally signed by the verifier.

A confirmation packet may be transmitted from the blockchain server to the verifier and may be used to confirm the hash of the authentication token. The confirmation packet may include a nonce and may be digitally signed by the blockchain server. The confirmation packet may also include information that was used to restrict authentication.

A blockchain hash may be created by the blockchain server and may be transmitted from the blockchain server to the user. The blockchain hash may be used as a basis of the authentication token and may be a hash of the blockchain that ends at the block containing the request packet. The hash may be created on a blockchain when a request packet is transmitted by a user to a blockchain server. For example, the blockchain server receives a request packet from the user and in response to the received request, adds the request packet to the blockchain. Next, the blockchain server hashes the whole blockchain created for a verifier beginning with the genesis block, until the block containing the request packet (i.e., the last block) uses the hash for an authentication token. The hash may be different and unique for each request as the blockchain keeps altering with each request. The hash may contain data about the blockchain such as the blockchain size or the requested packet block index. The hash may also contain a nonce, a timestamp, a non-repeated random number or other information used to restrict authentication to the asset. The blockchain hash may be digitally signed by the blockchain server.

An authentication token may be initiated by a user and created by a user device to authenticate user identifying information with a verifier. The authentication token may be transmitted from a user to a verifier for the purpose of authentication and the token may include a blockchain hash, a blockchain server signature of the blockchain hash, a nonce or other information that may be used to restrict authentication. The authentication token may also be digitally signed by the user.

A user may begin the process to access a protected resource by requesting authentication. Requesting authentication may include a user transmitting a request packet via a computing device (e.g., a smart phone or a laptop computer) to the blockchain server. When a user requests authentication, a request block may be created on the blockchain and the hash of the current blockchain may be transmitted to the user by the blockchain server. For example, a hash of the current blockchain may include a hash of the current cumulative blockchain data for a particular verifier that includes the genesis block of the verifier and the blocks containing data for all current users of the particular verifier. The user, via a user device, such as a personal computing device, a smart phone, a smart watch or a tablet, may create an authentication token (e.g., using a hash of the blockchain snapshot) using the received hash and then transmit the hash to the verifier server. The verifier server may request the blockchain server to verify the hash for user authentication to access the protected resource.

A blockchain snapshot may include all blocks of the blockchain beginning with the genesis block until the last block. The last block may include the user request. The snapshot may encompass all of the previous blocks containing user requests and confirmation packets up to the current point in time. The authentication token may include the blockchain hash, the blockchain server signature, the nonce and authentication restriction information (i.e., other information used to restrict authentication to the asset).

The hash code may include a hash of the whole blockchain that may include the genesis block created upon registration. Additionally, registration packets, request packets, confirmation packets, authentication success or failure confirmations and the current user request packet may be recorded on the blockchain. Registration may commence when the blockchain server receives registration packets, such as the verifier registration packet and the user registration packet. In response to the received registration packets, the authentication token may be generated.

For example, to create a fixed size authentication token, all of the blockchain data is passed to a one-way hash algorithm (e.g., the SHA256 one-way hash algorithm). The one-way hash algorithm may take an arbitrary size length data and produce a unique 32-byte hash of the data. The result of the hash function may then be used as the authentication token. The authentication token may include the digitally signed blockchain server hash, a nonce and identifying information.

In alternate embodiments, restrictions may be imposed on the authentication process that may be part of an audit process. One restriction may include an authentication process that has to be authenticated in the same order that a request entry is created in the blockchain. For example, user A creates an authentication request and then user B creates an authentication request, therefore, under this restriction, user B can only be authenticated after user A is authenticated.

One other restriction may include an authentication process that may be authenticated within a time period or time interval. For example, if a window of time is set for 2 hours and user A creates an authentication request at 8:00 AM, then user A must authenticate by or before 10:00 AM on a particular date. The blockchain may be used to authenticate the user based on the time of the authentication request and the set time period.

Another restriction may include a global positioning system (GPS) location of a mobile device that transmits the GPS location as part of the authentication request. The location restriction may limit where the authentication may take place. For example, user A obtains access to a work database and updates client information using a smart phone while not at work. A mistake is made while inputting the data and the manager of user A finds the mistake. The manager may send a request to the blockchain server and find the geo-location of user A when the mistake was entered and impose a restriction on user A. The restriction may restrict access to the verifier and the blockchain server when user A is at that particular geo-location that may not be work related. This is a non-repudiation service that allows the manager to impose restrictions and user A may not deny the non-work related location when entering client data incorrectly. The geo-location restriction may be imposed on user A by the manager by restricting user A's access to the verifier and the verifier may transmit the restriction to the blockchain database. The blockchain database may add the restriction information as a special block on the blockchain.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a blockchain authentication 110a. The networked computer environment 100 may also include a server 112 that is enabled to run a blockchain authentication 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the blockchain authentication 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the blockchain authentication 110a, 110b (respectively) to authenticate user access to a protected resource. The blockchain authentication method is explained in more detail below with respect to FIGS. 2-4.

Figure 2:
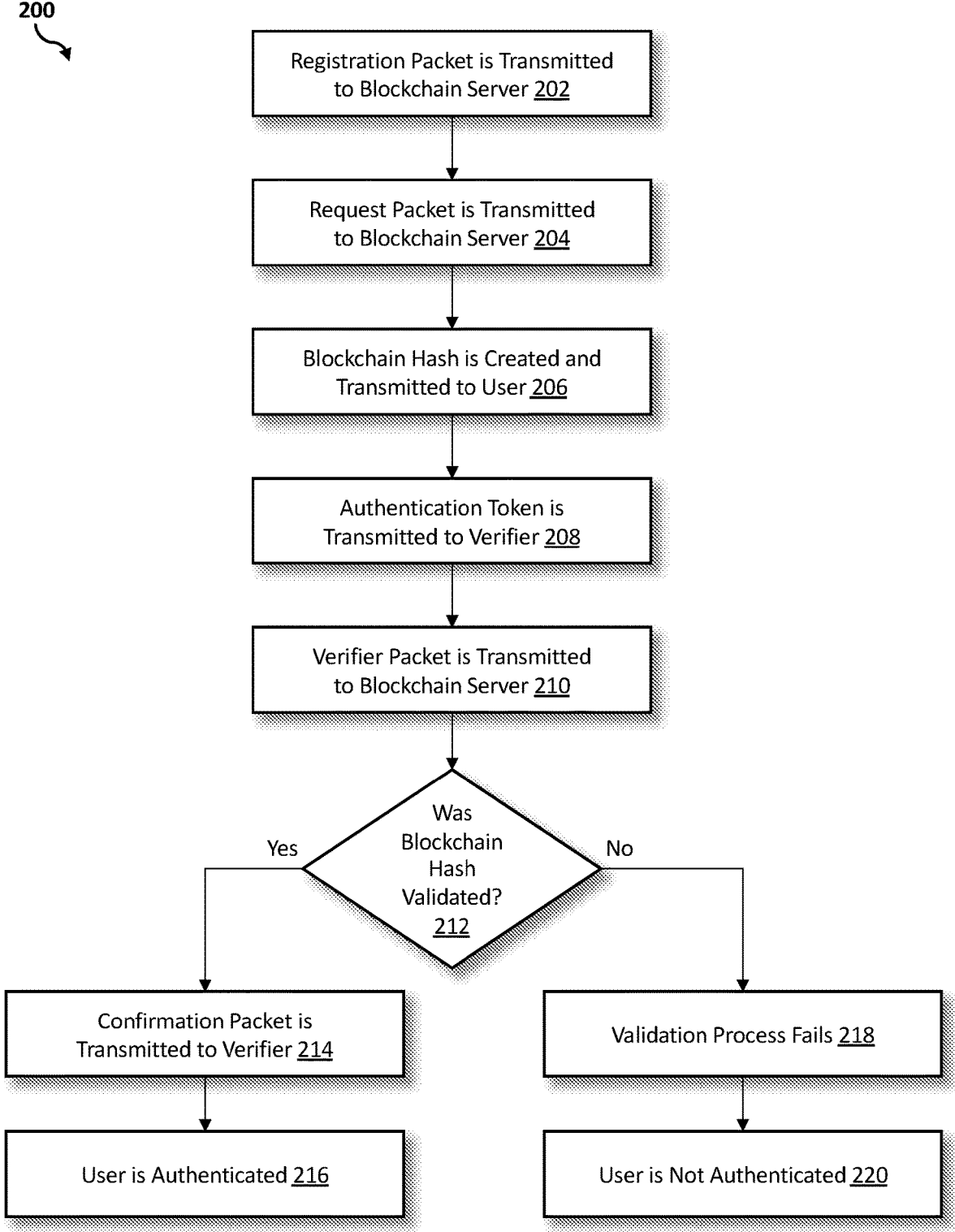
FIG. 2 is an operational flowchart illustrating a process for the blockchain based coupling of authentication and an authentication audit log according to at least one embodiment.

Referring now to FIG. 2, an operational flowchart illustrating the exemplary blockchain based coupling of authentication and an authentication audit log process 200 used by the blockchain authentication 110a, 110b according to at least one embodiment is depicted.

At 202, a registration packet is transmitted to a blockchain server. One or more registration packets may be transmitted to the blockchain server. The verifier may register with the blockchain server by transmitting the verifier registration packet to the blockchain server, for example, using a secure channel. The blockchain server may receive the verifier registration packet and create a new blockchain by using the verifier registration packet as the genesis block (i.e., first block) on the new blockchain. The verifier registration packet may include a verifier public key, verifier identification data, for example, a verifier public key, a nonce, a verifier digital signature and registered user identification information such as a list of names, email addresses, URLs and security questions and answers for users.

A user registration packet may also be transmitted to the blockchain server. A user may register with the blockchain server by transmitting a user registration packet to the blockchain server. For example, a user registers with a blockchain server to obtain access to restricted data by transmitting, via a communication network 116, the user registration packet to the blockchain server using a computing device (e.g., personal computer, smart phone, smart watch or tablet). The blockchain server may receive the user registration packet and add the user registration packet as a new block on the blockchain. The user registration packet may be digitally signed by the user and may include, for example, a user public key, verifier server information, user identification information, the user public key and security questions and answers.

New users may be added after the genesis block is generated by registering (i.e., transmitting the registration packet) with the blockchain server. The blockchain server may store the new user registration packet at the end of the blockchain. In the case of a lost private key (e.g., a user loses a private key out of the public/private asymmetric key pair), a new key pair may be assigned from a trusted certificate authority. The details of the new key pair assignment may be added to the current block on the blockchain.

A blockchain authentication example that may allow users, user A and user B, to access a protected resource, is provided. The protected resource is a database. User A is operating a smart phone mobile application and user B is operating a desktop application on a laptop computer to access the database (i.e., the protected resource). The verifier is the authenticator of the database called DB_Server. The blockchain server is a cloud application called Auditing Service Application (ASA). All network communication between the users, the verifier (i.e., DB_Server) and the blockchain server (i.e., ASA) are transmitted over a transport layer security (TLS) secure channel.

All packets in this example are signed by the user's private key. User A, user B, DB_Server and ASA each generate public and private key pairs, respectively. User A and user B then register each corresponding user identification information (i.e., user name, user email address and user public key) with DB_Server. An additional primary authentication may be used, such as a password, for the DB_Server that may not be a part of the blockchain authentication process.

The DB_Server transmits the registration packets for user A, user B and DB_Server to the ASA. In response to receiving the registration packets, the ASA creates a blockchain for the DB_Server and adds the registration packets as new blocks to the blockchain.

Then, at 204, a request packet is transmitted to the blockchain server. The user may transmit the request packet, via a computing device over a communication network 116, to the blockchain server. In response to the transmitted request packet, the request packet may be added to the blockchain as the latest block and the hash may be computed on the whole blockchain, beginning with the genesis block and including the last block which contains the request packet.

Continuing from the previous example, user A wants to access the database (i.e., the protected resource) to update the database with customer details that were recently received. User A is at a non-work related location and user A is requesting authentication via a smart phone. User A accesses DB_Server using a password for a primary authentication method. The request packet for user A is transmitted from the smart phone of user A to the ASA requesting an authentication hash. The user A request packet includes the geolocation, the time, the mobile number and the identification details for user A.

An additional user, user B also would like to access the database to update customer details and accesses the DB_Server via a primary authentication password. The user request packet for user B is transmitted from a laptop computer of user B to the ASA requesting an authentication hash. The user B request packet includes the geolocation, the time, the IP address and the identification details for user B. The request packet from user A is transmitted to the ASA at a point in time that is before the request packet from user B is transmitted to the ASA (i.e., user A sends request packet at $T_0$ and user B sends request packet at $T_1$).

At 206, the blockchain hash is created and transmitted to the user. The blockchain server may use the data from the request packet received at 204 to create a new block on the blockchain. The blockchain server may create a blockchain hash of the blockchain that starts at the genesis block and ends at the block that contains the request packet information (i.e., the hash may include the request packet information in the hash). The blockchain server may then transmit the hash to the user. The user may create an authentication token using or incorporating the received blockchain hash.

Continuing from the previous example, the ASA successfully verifies the signature and the identification details of the request transmitted by user A. The ASA adds the request packet from user A as a block to the blockchain. In response to the added request packet, the ASA creates a one-time hash of the whole blockchain, including the user A request packet, and transmits a digitally signed hash to the smart phone of user A using a one-way SHA256 hash that produces a 32-byte hash.

The ASA successfully verifies the signature and the identification details of the request transmitted by user B. The ASA adds the request packet from user B as a block to the blockchain, creates a one-time hash of the whole blockchain, including the request packet from user A and the request packet from user B, and then transmits the digitally signed hash to the laptop of user B using a one-way hash.

At 208, an authentication token is transmitted to the verifier. The user may transmit the authentication token created at 206 to the verifier for authentication. Continuing from the previous example, in response to receiving the hash from the ASA, an authentication token is generated from the smart phone of user A. The authentication token is generated using the digitally signed hash, a nonce and the current geo-location, time and mobile number for user A. The generated authentication token is digitally signed by the user A device and is transmitted from the smart phone of user A to the DB_Server. For user B, the authentication token is generated using the digitally signed hash from the ASA, a nonce and the current geo-location, time and IP address for user B. The generated authentication token for user B is digitally signed and transmitted from the laptop of user B to the DB_Server.

Then, at 210, the verifier packet is transmitted to the blockchain server. The verifier may create a verifier packet using the authentication token received from the user. The verifier may send the verifier packet to the blockchain server for authentication (i.e., validation). Continuing from the previous example, in response to receiving the generated authentication token received from user A and user B, respectively, the DB_Server resigns the authentication token that was digitally signed by the user A smart phone and transmits the authentication token to the ASA. The DB_Server also resigns the authentication token that was digitally signed by the user B laptop and transmits the authentication token to the ASA.

At 212, the blockchain authentication program 110a, 110b determines if the blockchain hash is validated. The blockchain may validate the blockchain hash using the received verifier packet. The blockchain identification program 110a, 110b may determine if the blockchain hash is validated by comparing the hash in the verifier packet with the hash on the blockchain server (i.e., the original hash created at 206). The blockchain server may also check other additional authentication restrictions.

Continuing from the previous example, in response to receiving the authentication token of user A from the DB_Server, the ASA compares the hash of all of the blocks in the blockchain up to and including the request block of user A with the received hash in the authentication token. The ASA adds the user A authentication token to the blockchain. Correspondingly, to user B, the ASA compares the hash of all of the blocks in the blockchain up to and including the request block of user B with the received hash in the authentication token and adds the user B authentication token to the blockchain.

If the blockchain authentication program 110a, 110b determines that the blockchain hash is valid at 212, then a confirmation packet is transmitted to the verifier at 214. A matching hash comparison between the verifier packet hash and the blockchain hash and any other authentication restriction confirmations may provide validity. The validity may provide confirmation for the blockchain server to add the verifier packet and result of the hash comparison to the blockchain. The blockchain server may reply to the verifier with a confirmation packet. The confirmation packet may confirm the hash of the authentication token and may be digitally signed by the blockchain server.

Continuing from the previous example, in response to validating the blockchain hash, the ASA adds the validity result to the blockchain as a confirmation of the hash comparison matching in step 212. The ASA transmits the confirmation packet for user A and user B to the DB_Server.

At 216, the user is authenticated. The verifier may transmit a message to the user confirming a successful validation and authentication. The user may then access the protected resource. Continuing from the previous example, in response to the confirmation packet that was transmitted from the ASA to the DB_Server, user A and user B may have access to the database.

If the blockchain authentication program 110a, 110b determines that the blockchain hash is not valid at 212, then the validation process fails at 218. The blockchain server may perform a hash comparison to validate the user and verifier data and the compared hashes may not match between the verifier packet and the blockchain server. The result of hashes that do not match once compared may fail the validation process. Upon an unsuccessful hash comparison or other data restriction failures, the blockchain server may add the verifier packet and the unsuccessful validation result to the blockchain. The blockchain server may reply to the verifier with a confirmation packet that provides data regarding an unsuccessful authentication or verification.

At 220, the user is not authenticated. The verifier may transmit a message to the user that communicates an unsuccessful validation and authentication. The user may not access the protected resource.

Figure 3:
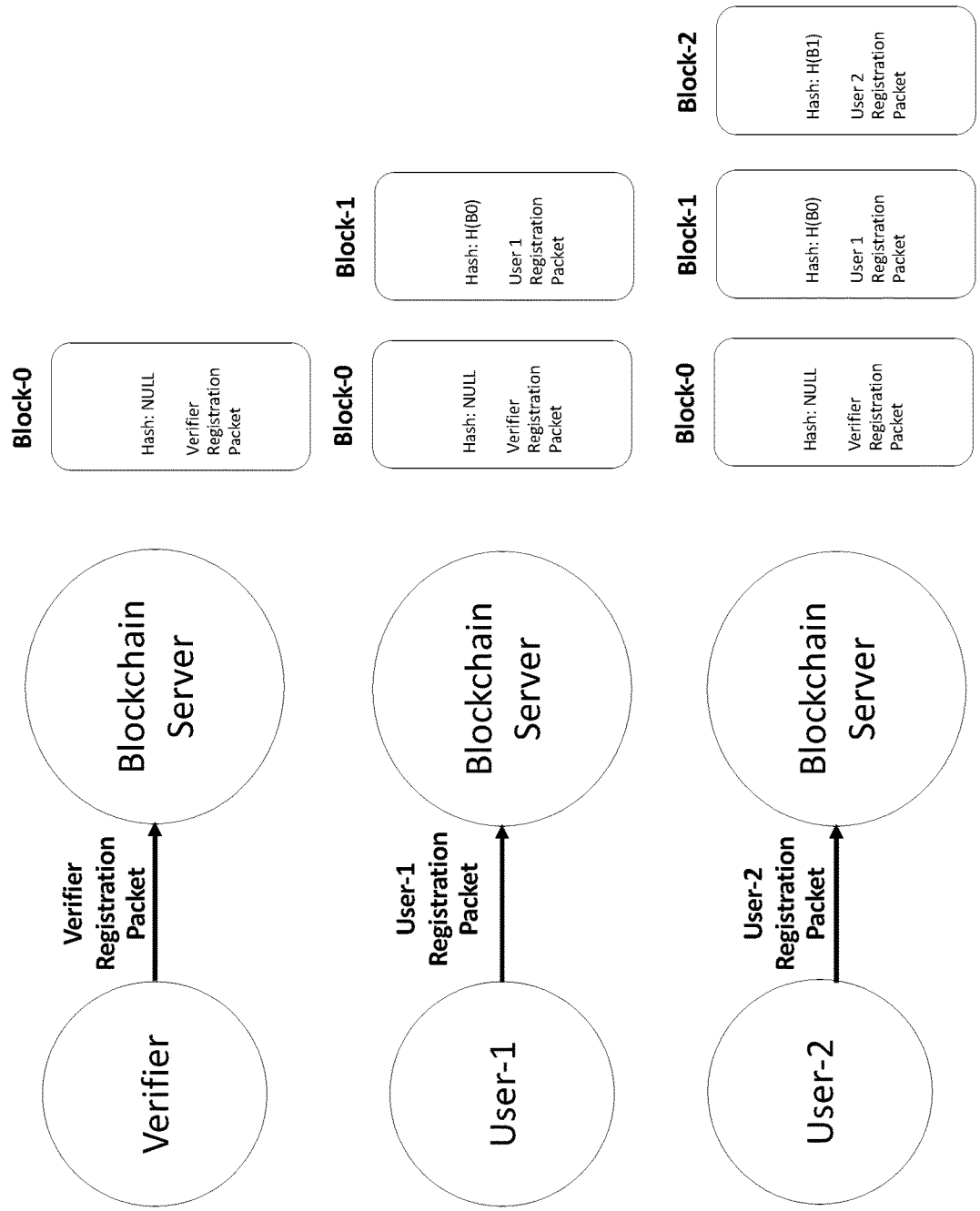
FIG. 3 is a block diagram example of the blockchain content for the verifier and user registration process 300 according to at least one embodiment.

Referring now to FIG. 3, a block diagram of an example verifier and user registration process 300 with corresponding blockchain content used by the blockchain authentication 110a, 110b according to at least one embodiment is depicted.

To register the verifier and one or more users with a blockchain server, the verifier may transmit the verifier registration packet to the blockchain server for an initial registration. The verifier registration packet may include the verifier identification information, the verifier public key, the verifier digital signature and the identification information for all registered users (i.e., users registered to the verifier). The initial registration packet transmitted from the verifier may create the genesis block, Block-0, using the transmitted information in the initial registration packet. User-1 may then transmit the User-1 Registration Packet and then User-2 transmits the User-2 Registration Packet for each initial user registration. In response, the blockchain server creates Block-1 and Block-2, respectively. User registration packets contain information about the verifier, user identification information, user public key and user digital signature. Once the User-1 and User-2 registrations are validated (i.e., registered at the genesis block, Block-0), the blockchain server creates blocks for each user registration packet received and stores the hash from the previous block. Example blockchain contents during the registration packet verification is presented below.

Verifier and User Registration

| Time | Packet to Blockchain Server | Blockchain Contents |
|---|---|---|
| T = 0 | Verifier Registration | Block-0 (Hash is Null + Verifier Registration Packet) |
| T = 1 | User-1 Registration | Block-0 + Block-1 (Hash of Block-0 + User-1 Registration Packet) |
| T = 2 | User-2 Registration | Block-0 + Block-1 + Block-2 (Hash of Block-1 + User-2 Registration Packet) |

Figure 4:
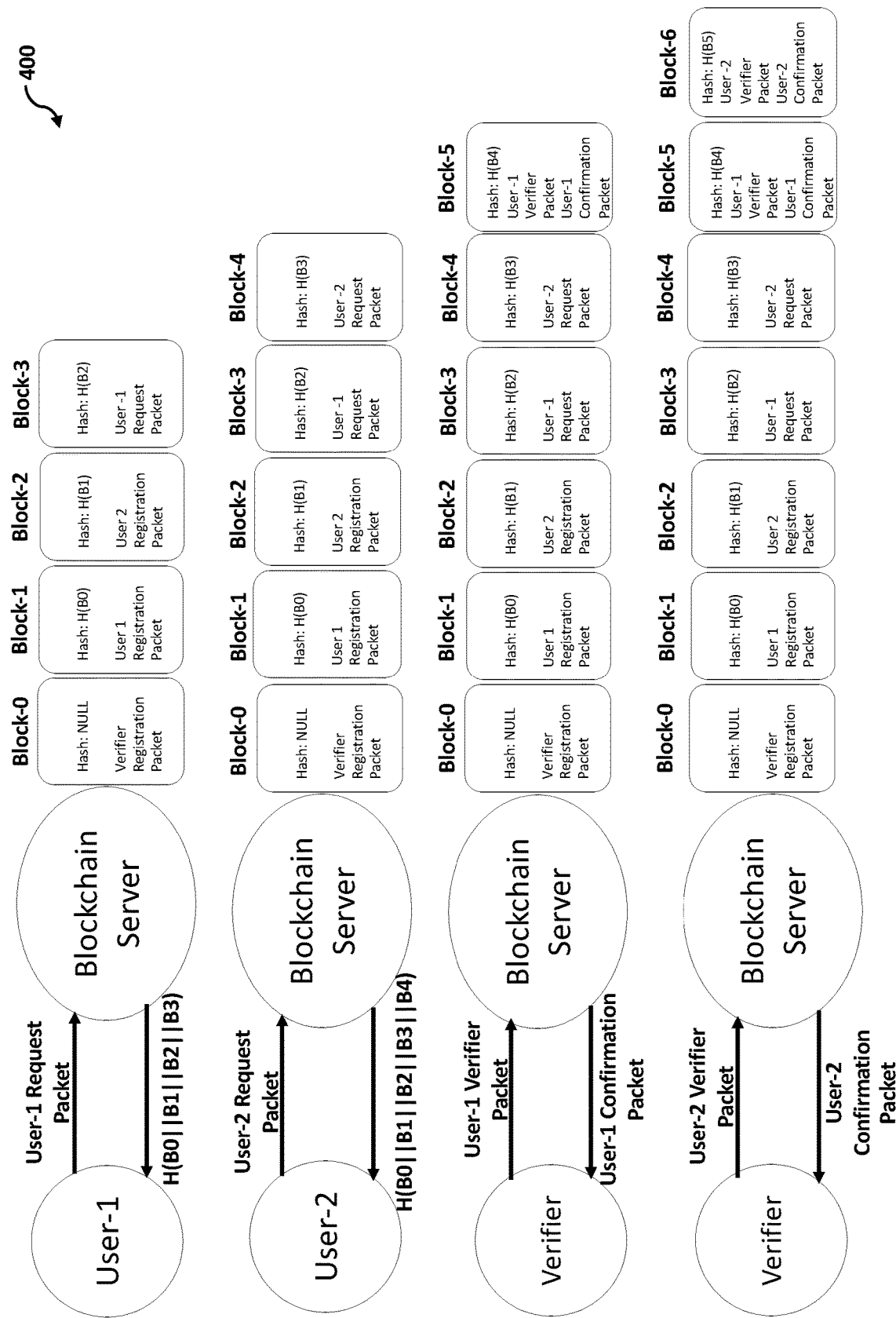
FIG. 4 is a block diagram example of the blockchain content for the authentication request process 400 according to at least one embodiment.

Referring now to FIG. 4, a block diagram of an example authentication request process 400 with corresponding blockchain content used by the blockchain authentication 110a, 110b according to at least one embodiment is depicted.

The authentication request process includes User-1 and User-2 request packets being transmitted, in respective order, to the blockchain server, requesting a blockchain hash. In response, the blockchain server validates the user identification, creates a new block and stores the created hash (i.e., hash of previous block) on the new block. The blockchain server then computes hash of the entire blockchain and returns it to User-1 and User-2, respectively. The users, via a computing device, create an authentication token with the received blockchain hash and transmit the authentication token to the verifier. The verifier transmits each packet (i.e., User-1 verifier packet and User-2 verifier packet) to the blockchain server and the blockchain server compares the hashes. Once the hashes are verified for each user, the blockchain server transmits confirmation packets (i.e., User-1 confirmation packet and User-2 confirmation packet) back to the verifier.

The blockchain content for the authentication request process, as a continuation of FIG. 3 above, is depicted.

Authentication Request Process

| Time | Packet to Blockchain Server | Blockchain Contents | Hash |
|---|---|---|---|
| T = 3 | User-1 Request | Block-0 + Block-1 + Block-2 + Block-3 (Hash of Block-2 + User-1 Request Packet) | Blocks 0-3 |
| T = 4 | User-2 Request | Block-0 + Block-1 + Block-2 + Block-3 + Block-4 (Hash of Block-3 + User-2 Request Packet) | Blocks 0-4 |
| T = 5 | User-1 Verifier | Block-0 + Block-1 + Block-2 + Block-3 + Block-4 + Block-5 (Hash of Block-4 + User-1 Verifier Packet + User-1 Confirmation Packet) | Blocks 0-5 |
| T = 6 | User-2 Verifier | Block-0 + Block-1 + Block-2 + Block-3 + Block-4 + Block-5 + Block-6 (Hash of Block-5 + User-2 Verifier Packet + User-2 Confirmation Packet) | Blocks 0-6 |

The blockchain based authentication process couples the authentication history with the authentication process. Additionally, user authentication tokens may not be reused due to differing hash values at each entry.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
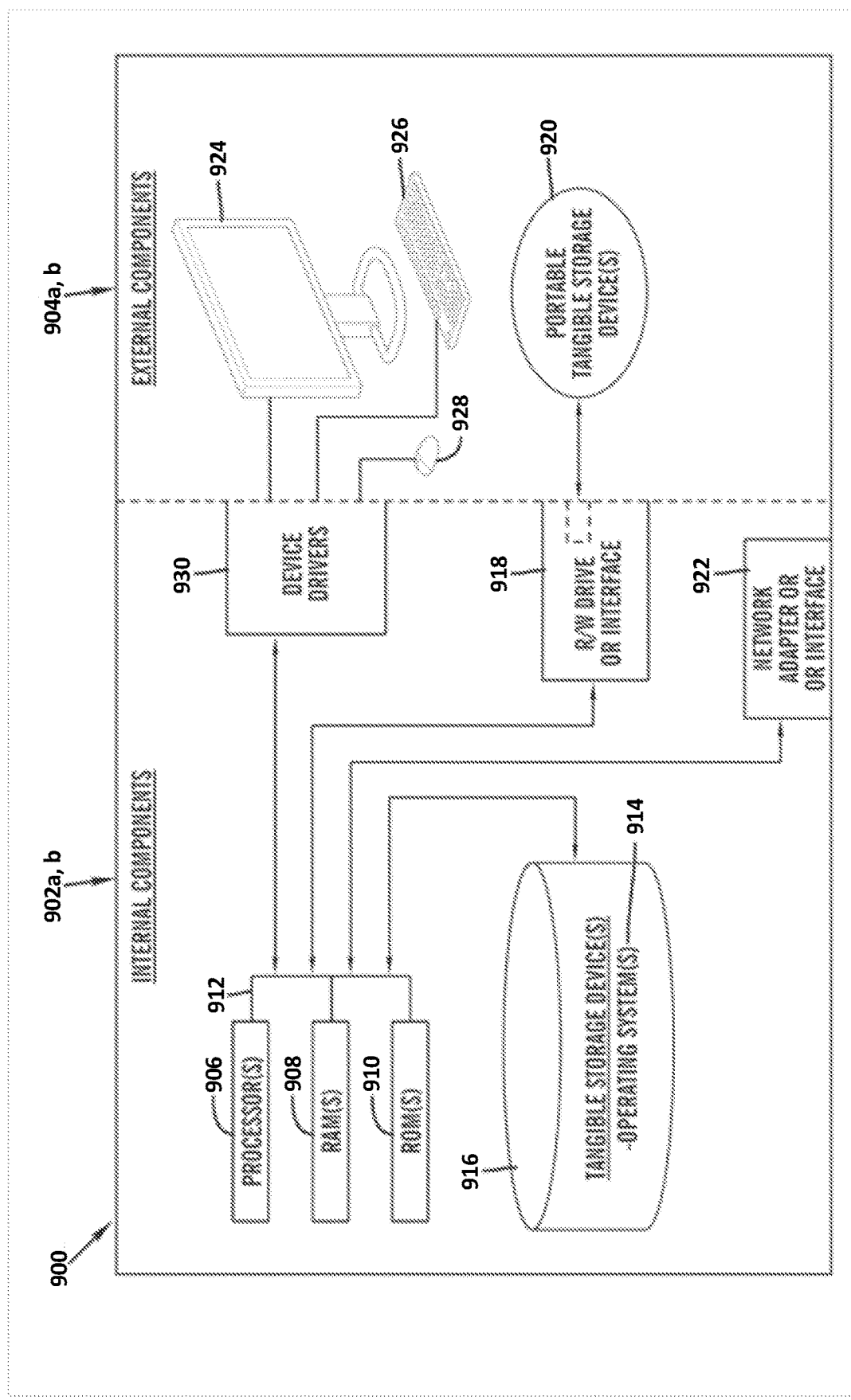
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the blockchain authentication 110a in client computer 102, and the blockchain authentication 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the blockchain authentication 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the blockchain authentication 110a in client computer 102 and the blockchain authentication 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the blockchain authentication 110a in client computer 102 and the blockchain authentication 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
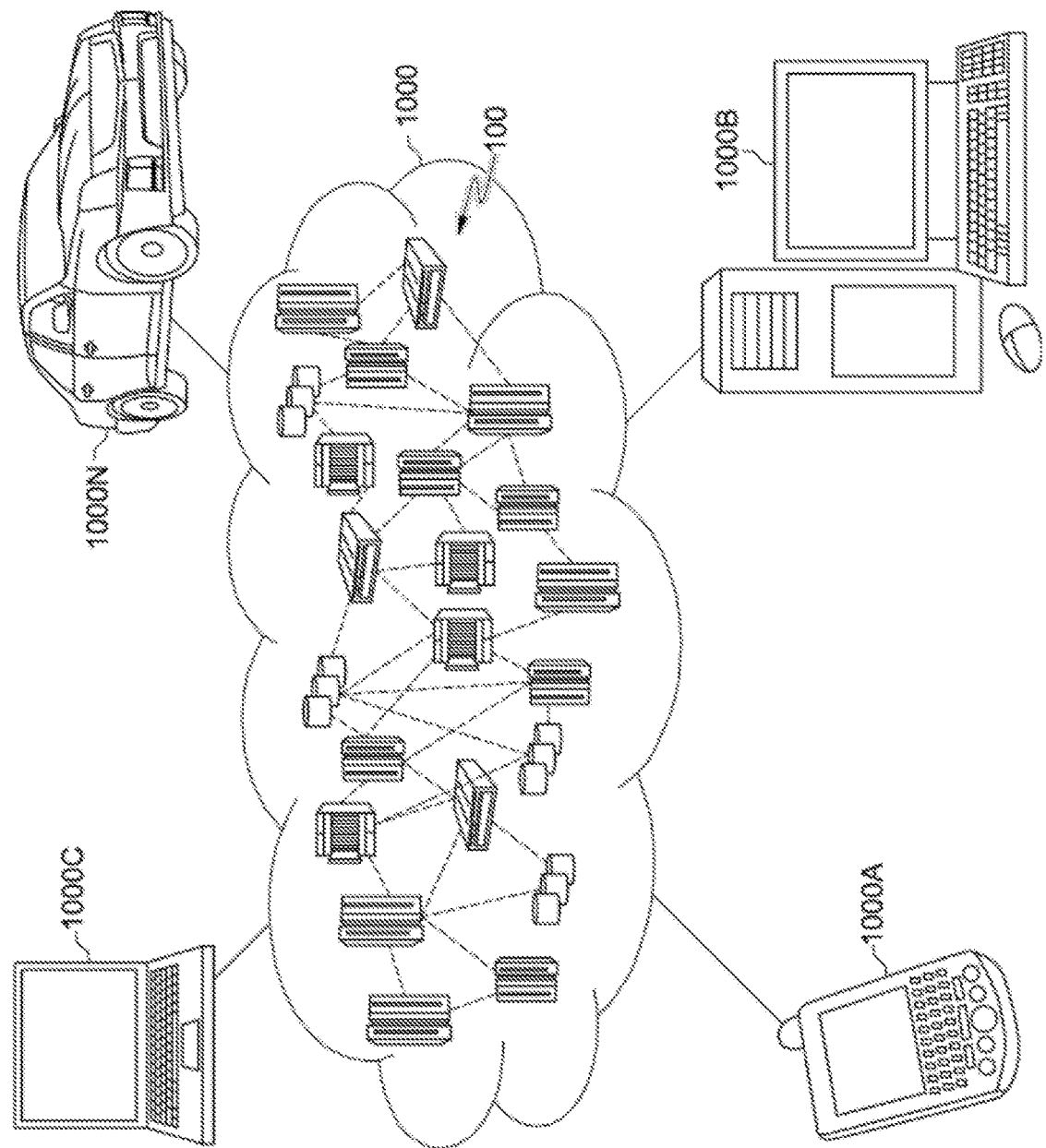
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
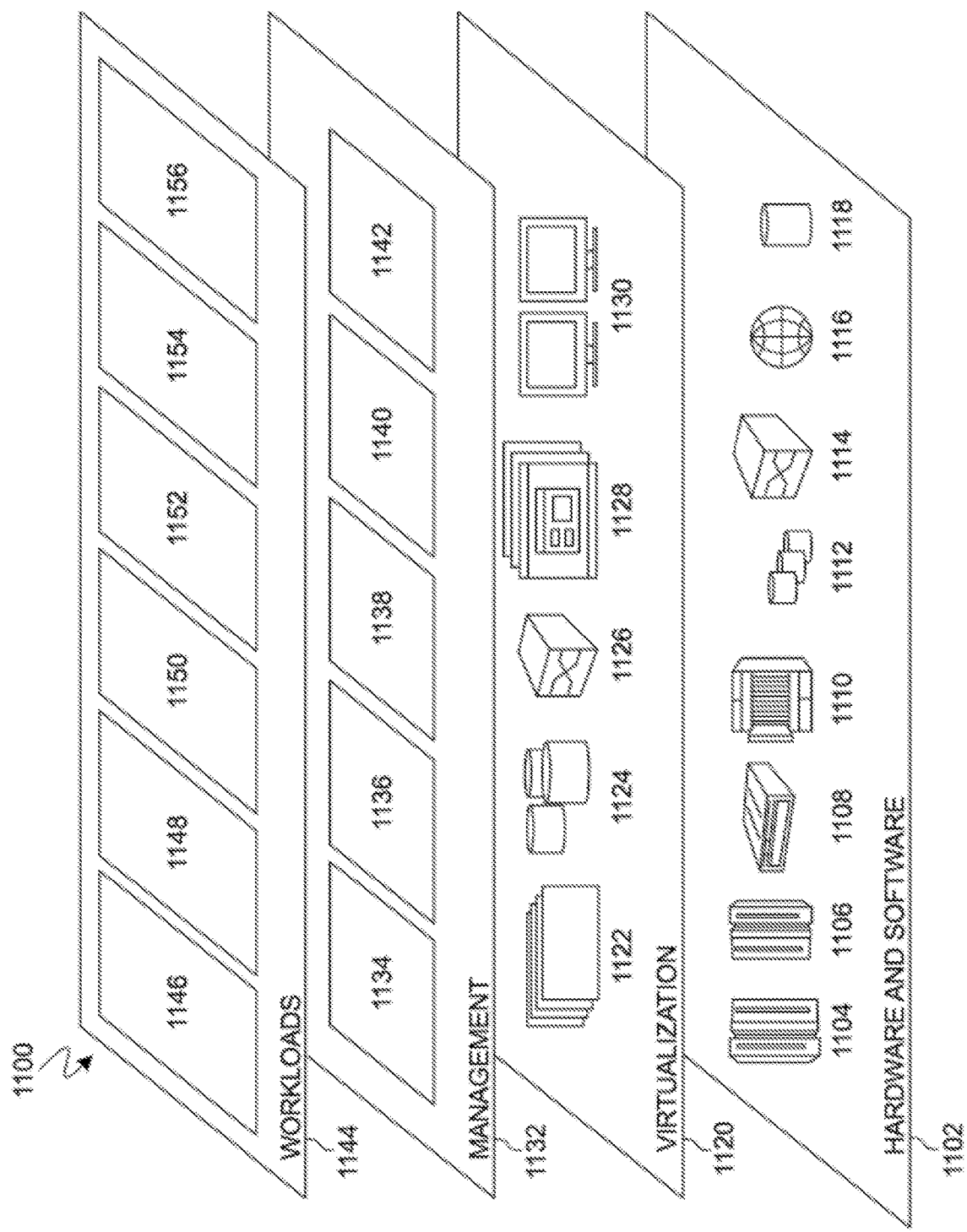
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and blockchain authentication 1156. A blockchain authentication 110a, 110b provides a way to use blockchain technology to record and create authentication tokens that may ensure a tightly coupled authentication history with the authentication process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for blockchain based authentication, the method comprising:
   receiving a request packet;
   adding the request packet to a blockchain;
   receiving a verifier registration packet;
   creating a genesis block using the verifier registration packet as the genesis block;
   creating a hash based on the added request packet and blockchain data, wherein an authentication history is used to create the hash, wherein the hash is a cumulative hash that begins with a genesis block and ends with the added request packet;
   transmitting the hash to a user; and
   receiving a verifier packet, wherein the verifier packet includes an authentication token generated by the user that incorporates the hash, wherein the hash is used as a basis of the authentication token, validating the hash and the authentication token by comparing the hash of all blocks in the blockchain up to and including a request block of the user with the hash in the authentication token; and
   transmitting a successful authentication message to the user.

2. The method of claim 1, further comprising:
   receiving a user registration pocket.

3. The method of claim 1, further comprising:
   failing the validation of the hash and the authentication token; and
   transmitting an unsuccessful authentication message to the user.

4. The method of claim 1, wherein the request packet includes identification information of the user, a public key of the user, a nonce of the user and a digital signature of the user.

5. The method of claim 1, wherein the authentication token includes the hash, a nonce, digital signatures, identifying information of the user and authentication restrictive information of the user.

6. A computer system for blockchain based authentication, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving a request packet;
   adding the request packet to a blockchain;
   receiving a verifier registration packet;
   creating a genesis block using the verifier registration packet as the genesis block;
   creating a hash based on the added request packet and blockchain data, wherein an authentication history is used to create the hash, wherein the hash is a cumulative hash that begins with a genesis block and ends with the added request packet;

transmitting the hash to a user; and receiving a verifier packet, wherein the verifier packet includes an authentication token generated by the user that incorporates the hash, wherein the hash is used as a basis of the authentication token, validating the hash and the authentication token by comparing the hash of all blocks in the blockchain up to and including a request block of the user with the hash in the authentication token; and transmitting a successful authentication message to the user.

7. The computer system of claim 6, further comprising:
receiving a user registration packet.

8. The computer system of claim 6, further comprising:
failing the validation of the hash and the authentication token; and transmitting an unsuccessful authentication message to the user.

9. The computer system of claim 6, wherein the request packet includes identification information of the user, a public key of the user, a nonce of the user and a digital signature of the user.

10. The computer system of claim 6, wherein the authentication token includes the hash, a nonce, digital signatures, identifying information of the user and authentication restrictive information of the user.

11. A computer program product for blockchain based authentication, comprising:
one or more computer-readable tangible storage media and program instructions stored on at least one of the one or more computer-readable tangible storage media, the program instructions executable by a processor to cause the processor to perform a method comprising:
receiving a request packet;
adding the request packet to a blockchain;
receiving a verifier registration packet;
creating a genesis block using the verifier registration packet as the genesis block;
creating a hash based on the added request packet and blockchain data, wherein an authentication history is used to create the hash, wherein the hash is a cumulative hash that begins with a genesis block and ends with the added request packet;
transmitting the hash to a user; and
receiving a verifier packet, wherein the verifier packet includes an authentication token generated by the user that incorporates the hash, wherein the hash is used as a basis of the authentication token, validating the hash and the authentication token by comparing the hash of all blocks in the blockchain up to and including a request block of the user with the hash in the authentication token; and transmitting a successful authentication message to the user.

12. The computer program product of claim 11, further comprising:
receiving a user registration packet.

13. The computer program product of claim 11, further comprising:
failing the validation of the hash and the authentication token; and transmitting an unsuccessful authentication message to the user.

14. The computer program product of claim 11, wherein the request packet includes identification information of the user, a public key of the user, a nonce of the user and a digital signature of the user.

* * * * *